UNITED STATES PATENT OFFICE.

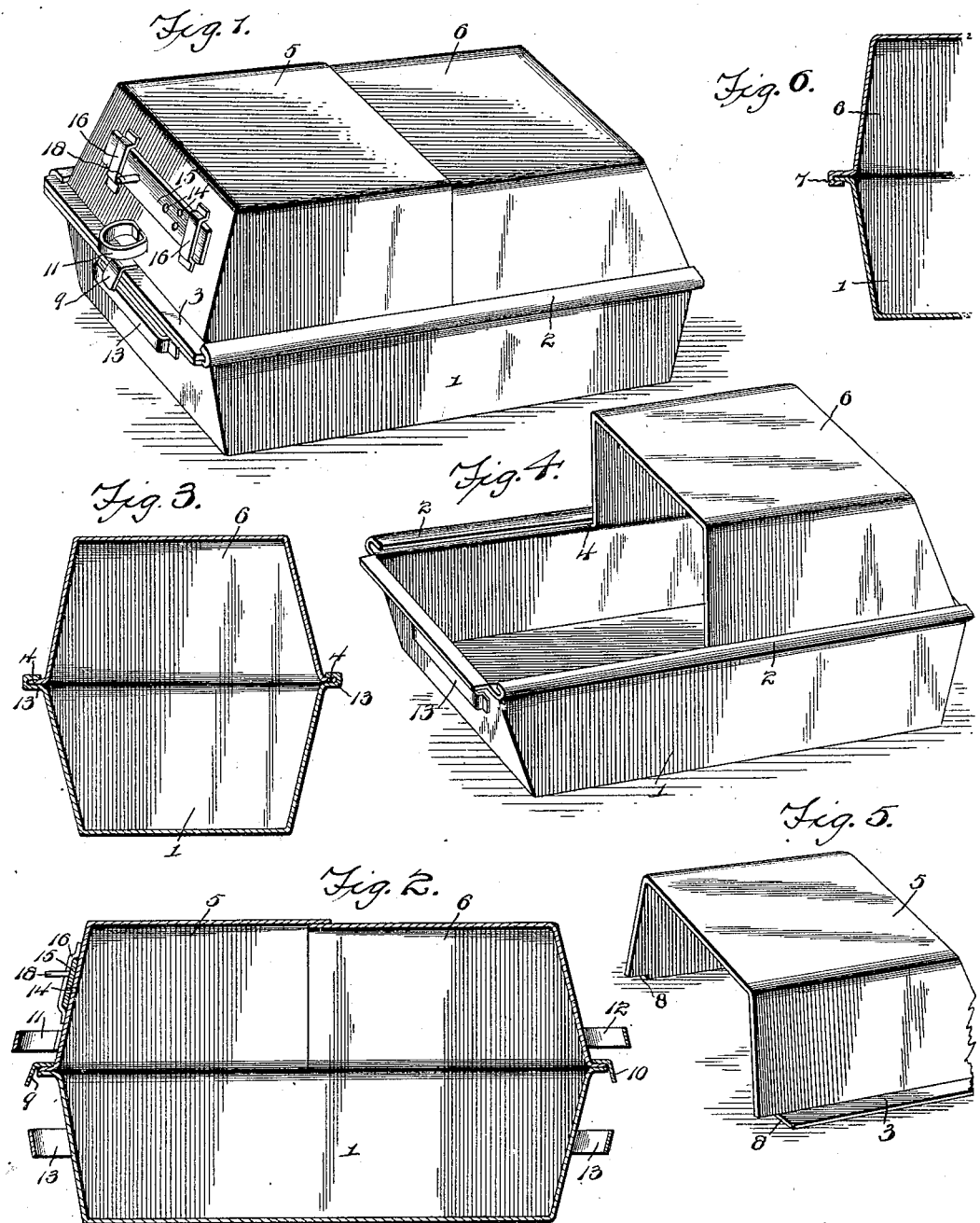

FRANK T. HEATLY AND MINNIE LEAVELL, OF STERLING, ILLINOIS.

ROASTING OR BAKING PAN.

SPECIFICATION forming part of Letters Patent No. 646,283, dated March 27, 1900.

Application filed January 16, 1899. Serial No. 702,294. (No model.)

*To all whom it may concern:*

Be it known that we, FRANK T. HEATLY and MINNIE LEAVELL, citizens of the United States, residing at Sterling, in the county of Whiteside and State of Illinois, have invented a new and useful Roasting or Baking Pan, of which the following is a specification.

The invention relates to improvements in roasting and baking pans.

The object of the present invention is to improve the construction of a roasting and baking pan and to provide a simple, inexpensive, and efficient one adapted to afford access to it to enable a roast to be examined and turned without necessitating the operator moving it from an oven, and thereby avoiding any liability of the operator being burned.

The invention consists in the construction and novel combination and arrangement of parts hereinfter fully described, illustrated in the accompanying drawings, and pointed out in the claim hereto appended.

In the drawings, Figure 1 is a perspective view of a roasting and baking pan constructed in accordance with this invention. Fig. 2 is a longitudinal sectional view. Fig. 3 is a transverse sectional view. Fig. 4 is a perspective view, the front section of the cover being removed. Fig. 5 is a detail perspective view of the front section of the cover. Fig. 6 is a detail sectional view showing the grooves or ways formed in the cover.

Like numerals of reference designate corresponding parts in all the figures of the drawings.

1 designates a pan forming the bottom or body portion of the combined baker and roaster and provided at opposite sides with longitudinal ways 2, consisting of grooves formed by bending the side edges of the pan inward upon themselves and receiving outwardly-extending flanges 3 and 4 of sections 5 and 6 of the top or cover of the baker and roaster; but, as illustrated in Fig. 6 of the accompanying drawings, a groove or way 7 may be provided at the sides of the front and rear sections 5 and 6 of the cover. The inner ends of the flanges 3 of the front section 5 are cut away at 8, as clearly shown in Fig. 5 of the accompanying drawings, to enable the inner end of the front section to overlap the rear section and effect a tight joint. The outer ends of the front and rear sections are provided with centrally-arranged stops 9 and 10, consisting of L-shaped arms or pieces arranged to engage the end edges of the bottom pan 1. The sections of the cover are also provided at their ends with suitable handles 11 and 12, and the bottom pan has handles 13.

When it is desired to examine a roast, the front section of the cover may be drawn outward without removing the combined roaster and baker from an oven, and when the said front section is detached, as illustrated in Fig. 4 of the accompanying drawings, the contents may be readily inspected and the roast may be turned and there is no liability of an operator being injured by burning or otherwise in handling the device.

The front section of the cover is provided with perforations 14 for the escape of steam, and these perforations may be covered and uncovered by a slide 15, having corresponding perforations and mounted in guides 16. The slide, which is located above the handle 11, is provided between its ends with a lug or projection 18, located between the guides and adapted to be readily engaged by the finger to operate the slide.

The invention has the following advantages: The combined baker and roaster is simple and comparatively inexpensive in construction, and its removable front section will enable a roast to be examined and turned without removing it from an oven, so that there is no liability of a person being burned or scalded in handling the device.

Changes in the form, proportion and minor details of construction may be resorted to without departing from the spirit or sacrificing any of the advantages of this invention.

What is claimed is—

A device of the class described comprising a bottom pan and a cover composed of two sections slidingly connected with the side edges of the bottom pan and adapted to be removed therefrom independently of each other, said sections being overlapped at their inner ends and provided at their outer ends with stops engaging the ends of the bottom pan, substantially as described.

In testimony that we claim the foregoing as our own we have hereto affixed our signatures in the presence of two witnessss.

FRANK T. HEATLY.
MINNIE LEAVELL.

Witnesses:
WALTER N. HASKELL,
W. P. PALMER.